P. PFLEIDERER.
KNEADING AND MIXING MACHINE.

No. 254,042.  Patented Feb. 21, 1882.

Witnesses
Jno. Haynes
Ed. Moran

Inventor
Paul Pfleiderer
by his Attorneys
Brown & Brown

UNITED STATES PATENT OFFICE.

PAUL PFLEIDERER, OF NORWOOD, COUNTY OF SURREY, ENGLAND.

KNEADING AND MIXING MACHINE.

SPECIFICATION forming part of Letters Patent No. 254,042, dated February 21, 1882.

Application filed February 16, 1880. Patented in England December 31, 1878, in France June 28, 1879, in Belgium July 7, 1879, in Austria November 11, 1879, in Italy January 31, 1880, and in Germany August 13, 1880.

*To all whom it may concern:*

Be it known that I, PAUL PFLEIDERER, of Norwood, in the county of Surrey, England, have invented a certain new and useful Improvement in Kneading and Mixing Machines, of which the following is a specification.

My invention relates to machines of the kind described in Letters Patent of the United States, No. 180,568, granted August 1, 1876, to Paul Freyburger, and assigned to me.

In such machines the kneading or mixing is done by two rotary blades of elliptical shape arranged obliquely or diagonally to their axes; and the object of my invention is to afford greater facility for the clearance of the blades to diminish strains due to the outward pressure of the material, especially when it is of a thick and heavy character, and at the same time to obtain a more thorough kneading.

To this end my invention consists in the combination, with a trough or case, of blades adapted to rotate therein, and composed of elliptical or ellipse-like disks set obliquely to their axes of rotation, and having gaps in their perimeters, which afford facility for the clearance of material and contribute to the thoroughness of the kneading operation.

Figure 1:
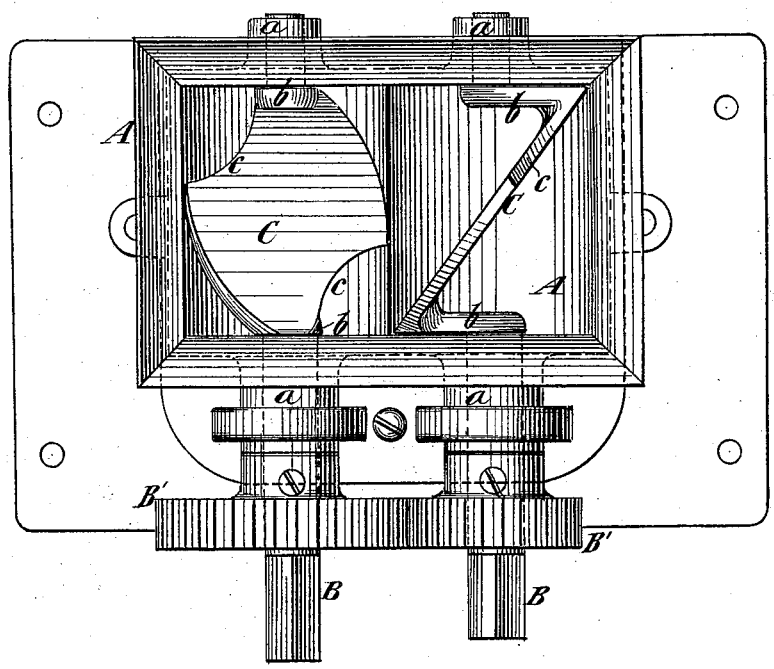
Figure 2:
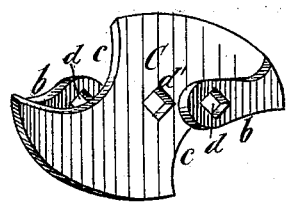
Figure 3:
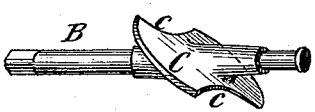
Figure 4:
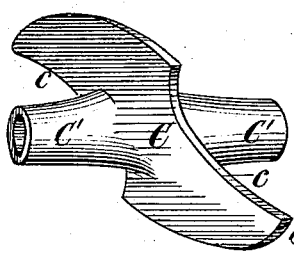

In the accompanying drawings, Figure 1 represents a plan of a machine embodying my invention, and Figs. 2, 3, and 4 represent different constructions of blades which may be employed, and all of which embody my invention.

Similar letters of reference designate corresponding parts in all the figures.

Referring first to Fig. 1, A designates the trough or case of the machine, which may be made of cast metal, and is provided in opposite sides with journal-bearings $a$. These bearings may be formed between the upper and lower parts of the trough or case, and partly in each, the caps of the bearings being formed by the top part.

B designates the mixer shafts or spindles, which fit in the bearings $a$, and are geared together by wheels B', so that both spindles will rotate in unison, but at different speeds.

C designates the mixing-blades, which are here represented as cast with their shafts or spindles B, they being united therewith by arms $b$ at each end of the blade. The arms $b$ travel close to the sides of the trough or case, and form scrapers to free the sides from dough or other material adhering to them. The blades C are of elliptical or ellipse-like form, and are oblique to the axes of the shafts B. In the drawings one of the blades is represented in face view, showing its form, while the other is in edge view, showing its obliquity.

In the perimeter of the blades are formed gaps $c$, which may be formed in casting the blades, and these gaps form spaces, which afford clearance for the material under operation and enable it to be more easily worked, especially where it is very stiff.

The blade C, shown in Fig. 2, is like those just described, except that it is made separate from its shaft. It has the same gaps $c$ and arms $b$, and the shaft is intended to be inserted through holes $d$ in the arms $b$, and a hole, $d'$, in the blade.

The blade C shown in Fig. 3 is cast with its shaft B, and has the gaps $c$, but the blade is connected with its shaft directly, instead of by arms $b$.

The blade C shown in Fig. 4 is like that shown in Fig. 3, except that instead of being cast with its shaft it is cast with a sleeve or hub, C', through which the shaft is to be inserted.

It will be observed that all the blades herein shown have the gaps $c$ in their perimeters, and no other openings through which material can pass.

What I claim as my invention, and desire to secure by Letters Patent, is—

The combination, in a kneading-machine, with a trough or case, of blades adapted to rotate therein, and composed of elliptical or ellipse-like disks set obliquely to their axes of rotation and having gaps $c$ in their perimeters, substantially as specified.

PAUL PFLEIDERER.

Witnesses:
WILLIAM SPENCE,
FRANK REDMAN.